Patented Mar. 6, 1923.

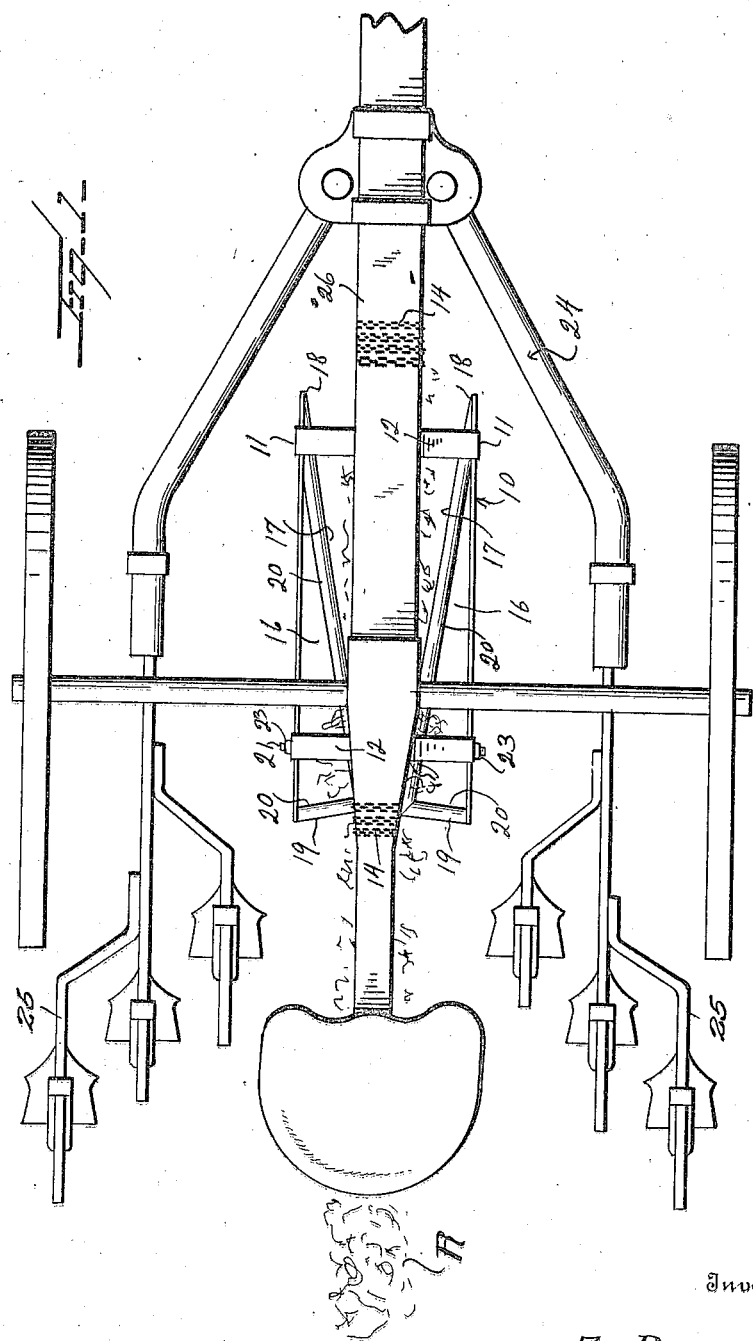

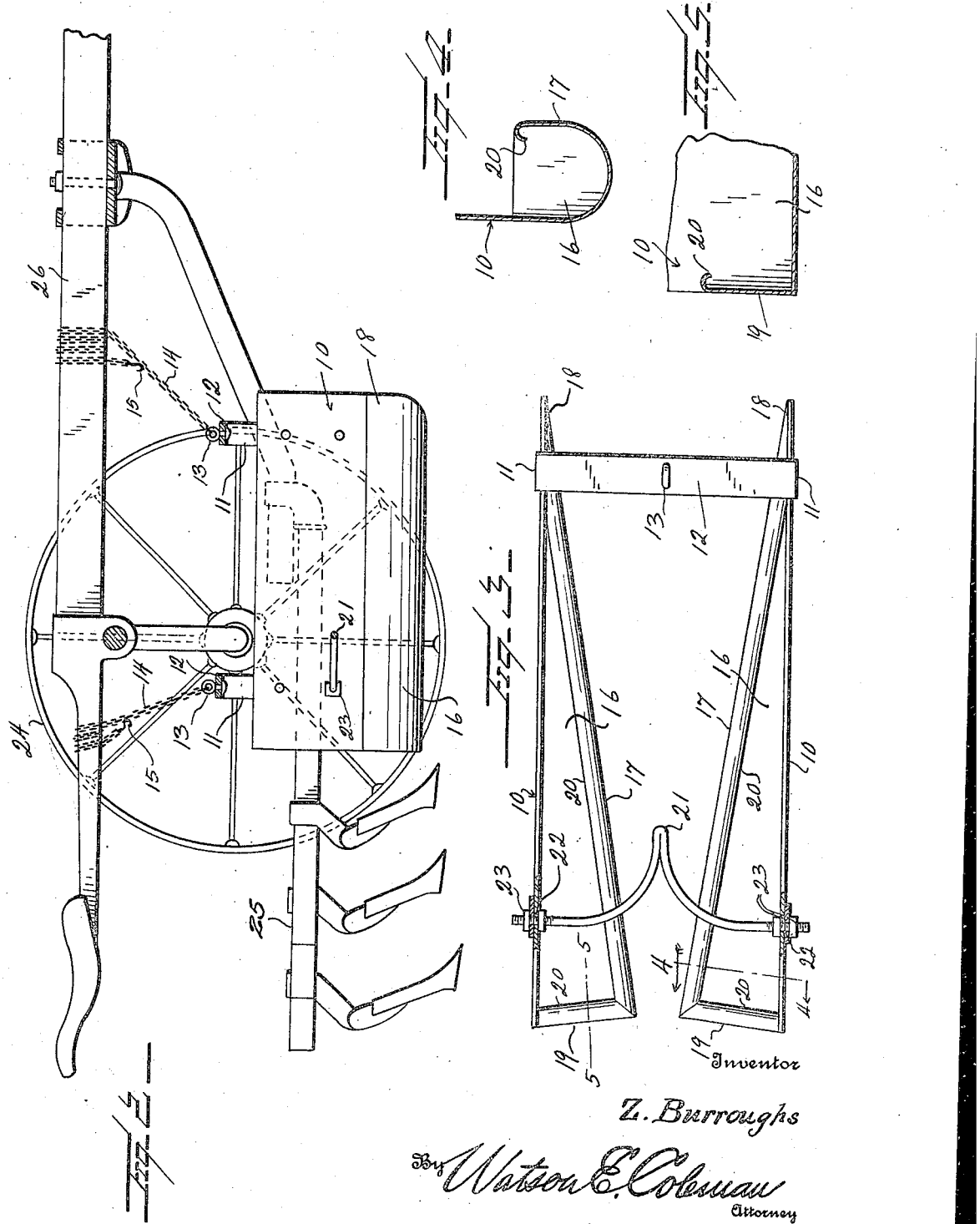

1,447,375

UNITED STATES PATENT OFFICE.

ZEPHINEAH BURROUGHS, OF WATERTOWN, SOUTH DAKOTA.

INSECT CATCHER.

Application filed February 23, 1922. Serial No. 538,678.

*To all whom it may concern:*

Be it known that I, ZEPHINEAH BURROUGHS, a citizen of the United States, residing at Watertown, in the county of Codington and State of South Dakota, have invented certain new and useful Improvements in Insect Catchers, of which the following is a specification, reference being had to the accompanying drawings.

This invention relates to insect catchers, and has for an important object thereof the provision of an insect catcher which may be readily attached to cultivators.

A further object of the invention is to provide in combination with a cultivator embodying spaced gangs of cultivating implements adapted to operate at opposite sides of a row of plants, means for supporting an insect catcher forwardly and intermediate of the gangs to operate upon the plants of the row prior to the operation of the cultivating implements in order that the earth disturbed by the gangs may not interfere with the proper operation of the insect catcher.

A still further object of the invention is to provide a device of this character which is particularly adapted for use in connection with rows of plants in which the plants have not come up in regular lines, as for example, in conjunction with rows of potato plants.

A still further object of the invention is to provide an insect catcher which is simple and efficient in construction and operation, durable in service, and a general improvement in the art.

Other objects and advantages of the invention will become apparent throughout the course of the following description.

In the accompanying drawings wherein for the purpose of illustration is shown a preferred embodiment of my invention and wherein like reference characters designate like parts throughout:

Figure 1 is a plan view of a cultivator showing an insect catcher constructed in accordance with my invention attached thereto;

Figure 2 is a longitudinal sectional view taken through the cultivator and insect catcher;

Figure 3 is a plan view of the insect catcher detached, parts being broken away;

Figure 4 is a section taken on the line 4—4 of Figure 3; and

Figure 5 is a section taken on the line 5—5 of Figure 3.

Referring now more particularly to the drawings, the numeral 10 indicates spaced side members maintained in spaced position by inverted U frames, the arms 11 of the U frames being secured to the side members and the bight portions 12 thereof each having an eye 13 secured thereto having a flexible element 14 mounted therein and provided at its free end with a hook 15. The U-shaped frame members are preferably two in number, the forward frame member being secured to the side members adjacent the forward end thereof and the rear frame member being secured to the side members at a point spaced inwardly from the rear ends of the side members.

The side members have formed at the lower end upon the inner side thereof a tapered trough 16, the inner wall 17 of the trough being secured to the side members at the forward end, as at 18, and to a trough end closure 19 which closes the rear end of the trough. The upper edges of the inner walls 17 and the end closures 19 are provided with return bends 20 overhanging the trough for a purpose hereinafter to appear.

The numeral 21 designates a horizontally disposed substantially V-shaped abutment member having the angle of the V forwardly directed and the ends of the arms thereof outwardly flaring and screw threaded. These screw threaded ends are interchangeably directed through openings 22 formed in the side members 10 at points adjacent the rear end thereof and are held in adjusted position by means of binding nuts 23 engaging opposite sides of the side members, the binding nuts permitting spreading of the V-shaped abutment member when so desired.

The numeral 24 designates a cultivator having spaced gangs 25 of cultivating implements adapted to operate upon opposite sides of a row R of plants. The numeral 26 indicates a traction and supporting beam of the cultivator by means of which the cultivator is drawn along the row and which extends over the row R of plants. In the use of my device the insect catcher is arranged beneath the cultivator with the narrow ends of the trough forwardly directed, and the flexible elements 14 passed about the beam 26. These flexible elements are preferably in the form of chains so that the hooks may be engaged in a desired link to vertically adjust the insect catcher and hold the same in such vertical adjusted position. It will be obvious from an inspection of the drawings that when the cultivator is drawn longitudinally of the row the plants will enter at the forward end between the side members and that the tapering troughs will move the plants toward a common center where they may be engaged by the V-shaped abutment member 21. This abutment draws and pushes the vines off to either side over the trough and drags and knocks the bugs from the plants into the troughs which are preferably filled to a given degree with water with the addition of kerosene. The insect catcher being flexibly supported and the rear support thereof being arranged forwardly of the rear end permits such rear end having its narrow outlet end to move from side to side to compensate for crookedness of the row due to plants coming up to one side or the other of the planting point. This device is particularly adapted for use in connection with potato plants and, as is well known to those familiar with the growth of these plants, though the row may be planted in a perfectly straight line, the plants will appear often as much as eight or ten inches to one side of the planting line. It will accordingly be seen that were the insect catcher rigidly supported and were no provision made to permit transverse movement of the rear end thereof, the plants, which are readily broken, would be much damaged by the passage thereover of the catcher.

From the foregoing it is believed to be obvious that an insect catcher constructed in accordance with my invention is particularly well adapted for the use for which it is intended by reason of the fact that it may be readily applied to cultivators now commonly in use and furthermore by reason of the fact that it permits of its usage with the cultivator without danger of breaking and destroying delicate plants which may have come up to one side or the other of the planting row. It will furthermore be obvious that the construction thereof as hereinbefore set forth is capable of some change and modification without materially departing from the spirit of my invention and I accordingly do not limit myself to such specific structure except as hereinafter claimed.

I claim:

The combination with a cultivator embodying spaced gangs of cultivating elements and a draw beam supporting the same, of means carried by the beam for engaging plants of a row being cultivated and separating and collecting insects therefrom embodying spaced side members each provided on the inner face of the lower end thereof with a trough increasing in width from front to back, a substantially V-shaped abutment member disposed intermediate said side members and having the apex portion thereof directed toward the forward ends of the members, the ends of the arms of said abutment member flaring outwardly and being threaded, spaced aligned openings formed in said side members and through which the arms of said abutment member extend, and adjustment nuts mounted upon the arms of the abutment member and abutting the side members.

In testimony whereof I hereunto affix my signature.

ZEPHINEAH BURROUGHS.